US010307878B2

(12) United States Patent
Herzinger et al.

(10) Patent No.: US 10,307,878 B2
(45) Date of Patent: Jun. 4, 2019

(54) METHOD FOR PRODUCING A COMPONENT OR A COMPONENT COMPOSITE CONSISTING OF A PLURALITY OF COMPONENTS, USING A CAMERA FOR DETECTING THE POSITION OF A COMPONENT

(71) Applicant: Bayerische Motoren Werke Aktiengesellschaft, Munich (DE)

(72) Inventors: Thomas Herzinger, Munich (DE); Johann van Niekerk, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 278 days.

(21) Appl. No.: 14/148,007

(22) Filed: Jan. 6, 2014

(65) Prior Publication Data
US 2014/0115895 A1    May 1, 2014

Related U.S. Application Data

(63) Continuation of application No. PCT/EP2012/061174, filed on Jun. 13, 2012.

(30) Foreign Application Priority Data

Aug. 5, 2011  (DE) .................. 10 2011 080 483

(51) Int. Cl.
*B23K 31/02* (2006.01)
*B23Q 17/24* (2006.01)
(Continued)

(52) U.S. Cl.
CPC ......... *B23Q 17/2409* (2013.01); *B21D 22/20* (2013.01); *B21D 53/88* (2013.01);
(Continued)

(58) Field of Classification Search
CPC ....... B23P 11/00; B23Q 15/22; B23Q 17/003; B23Q 17/24; B23Q 17/2414;
(Continued)

(56) References Cited

U.S. PATENT DOCUMENTS 4,942,539 A    7/1990  McGee et al.
5,150,623 A    9/1992  Woods
(Continued)

FOREIGN PATENT DOCUMENTS

CN    100408868 C    8/2008
DE    33 02 177 A1   8/1983
(Continued)

OTHER PUBLICATIONS

Chinese Office Action dated Apr. 3, 2015 (seven (7) pages).
(Continued)

*Primary Examiner* — Christopher J Besler
(74) *Attorney, Agent, or Firm* — Crowell & Moring LLP

(57) ABSTRACT

A method produces a component, particularly a body component for a vehicle, or a component composite consisting of several components. The steps include forming a metal plate in a forming tool, particularly in a deep-drawing die, producing a reference marking at a predefined location of the metal plate, rough positioning of the formed metal plate by a positioning device such that the reference marking is situated in a predefined space area, identifying the reference marking of a position recognition device, such as a camera system, the position recognition device generating position data corresponding to the position of the reference marking, positioning of a first fixing element at the location of the reference marking based on the position data by an electronically controlled positioning device, and connecting the first fixing element with the formed metal plate, particularly by welding.

9 Claims, 1 Drawing Sheet

(51) Int. Cl.
*B23K 9/20* (2006.01)
*B21D 22/20* (2006.01)
*B21D 53/88* (2006.01)
*B23K 11/00* (2006.01)
*B23K 101/00* (2006.01)

(52) U.S. Cl.
CPC ............ *B23K 9/20* (2013.01); *B23K 11/0046* (2013.01); *B23K 31/02* (2013.01); *B23Q 17/2414* (2013.01); *B23K 2101/006* (2018.08); *Y10T 29/49622* (2015.01); *Y10T 29/49895* (2015.01); *Y10T 29/49968* (2015.01)

(58) Field of Classification Search
CPC ............ B23Q 17/2428; B23Q 17/2452; B23Q 17/2409; B23K 31/02; G01B 11/002; G01B 11/14; Y10T 29/49895; Y10T 29/49902; Y10T 29/49769
See application file for complete search history.

(56) References Cited

U.S. PATENT DOCUMENTS

| | | | |
|---|---|---|---|
| 5,380,978 | A | 1/1995 | Pryor |
| 5,696,688 | A | 12/1997 | Leif et al. |
| 5,727,300 | A | 3/1998 | Ekdahl et al. |
| 7,354,217 | B2 * | 4/2008 | Soder .................. F16B 5/0664 403/374.5 |
| 8,064,686 | B2 | 11/2011 | Wagner et al. |
| 2002/0038159 | A1 | 3/2002 | Gass |
| 2003/0090682 | A1 | 5/2003 | Gooch et al. |
| 2005/0139411 | A1 | 6/2005 | Tsushima |
| 2007/0079491 | A1 | 4/2007 | Hader |
| 2008/0004633 | A1 * | 1/2008 | Arata ................. A61B 17/1764 606/130 |
| 2009/0070983 | A1 | 3/2009 | Stumpf et al. |
| 2011/0173797 | A1 | 7/2011 | van Niekerk et al. |
| 2013/0185916 | A1 | 7/2013 | Mantei et al. |

FOREIGN PATENT DOCUMENTS

| | | |
|---|---|---|
| DE | 197 45 728 A1 | 4/1999 |
| DE | 101 43 601 A1 | 3/2003 |
| DE | 696 32 309 T2 | 9/2004 |
| DE | 103 46 264 A1 | 4/2005 |
| DE | 10 2004 046 584 A1 | 5/2005 |
| DE | 10 2007 017 675 A1 | 10/2008 |
| DE | 10 2007 044 635 A1 | 4/2009 |
| DE | 10 2007 061 803 B3 | 6/2009 |
| DE | 10 2008 056 971 B3 | 12/2009 |
| DE | 10 2008 038 747 A1 | 2/2010 |
| DE | 10 2010 005 896 A1 | 10/2010 |
| DE | 10 2009 049 602 B3 | 7/2011 |
| DE | 10 2010 028 322 A1 | 11/2011 |
| DE | 10 2010 028 323 A1 | 11/2011 |
| DE | 10 2010 040 547 A1 | 3/2012 |
| EP | 0 680 792 A1 | 11/1995 |
| EP | 1 772 199 A1 | 4/2007 |
| EP | 2 154 054 A1 | 2/2010 |
| GB | 2 034 173 A | 6/1980 |
| WO | WO 00/17719 A1 | 3/2000 |

OTHER PUBLICATIONS

Reis, "WPR Overview—Ball Tensioner," WPR Product Overview—Workpiece Mounting, 2010, 51 pages, WPR System.

Praun, "Tolerance Analysis of Flexible Assemblies in the Product Development Process," 2002, 249 pages.

German Office Action with English translation dated Jul. 17, 2012 (seventeen (17) pages).

International Search Report dated Oct. 17, 2012 with English translation (six (6) pages).

Chinese Office Action issued in counterpart Chinese Application No. 201280026025.8 dated Dec. 4, 2015 with English-language translation (five (5) pages).

* cited by examiner

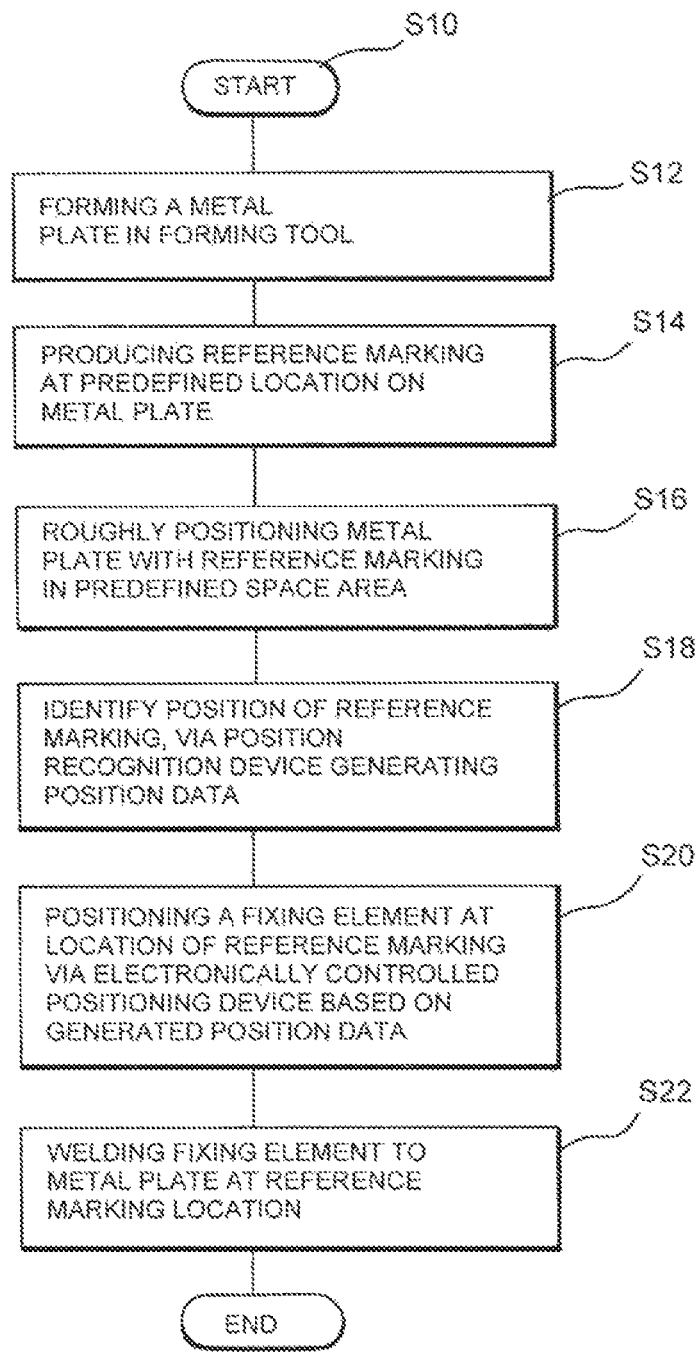

METHOD FOR PRODUCING A COMPONENT OR A COMPONENT COMPOSITE CONSISTING OF A PLURALITY OF COMPONENTS, USING A CAMERA FOR DETECTING THE POSITION OF A COMPONENT

CROSS REFERENCE TO RELATED APPLICATIONS

This application is a continuation of PCT International Application No. PCT/EP2012/061174, filed Jun. 13, 2012, which claims priority under 35 U.S.C. § 119 from German Patent Application No. DE 10 2011 080 438.8, filed Aug. 5, 2011, the entire disclosures of which are expressly incorporated by reference herein.

BACKGROUND AND SUMMARY OF THE INVENTION

The present invention relates to a method of producing a component, particularly a body component for a vehicle, or of a component composite consisting of several components, with the steps of forming a metal plate in a forming tool, particularly in a deep-drawing die, and producing a reference marking at a predefined location of the metal plate.

A method of this type is known from DE 10 2008 056 971 B3. Component connections, which are known from two German Patent Applications DE 10 2010 028 323.1 and DE 2010 040 547.7 (not prior art applications) are related with respect to the method of producing a component that is an object of the present patent application.

The relevant prior art also includes DE 10 2009 049 602 B3, DE 10 2008 038 747 A1, DE 10 2009 041 161 A1, DE 10 2010 028 322 A1, DE 10 2007 044 635 A1, DE 10 2004 046 584 A1, DE 33 02 177 A1, U.S. Pat. No. 4,942,539, U.S. 2003/0090682 A1, EP 1772199 A1, U.S. Pat. No. 5,150,623, DE 197 45 728 A1, DE 696 32 309 T2 as well as DE 10 2007 061 803 B3.

The above-mentioned DE 10 2009 049 602 B3 describes a vehicle body construction method for the detachable prefixing of two components to be firmly connected with one another, of which at least one of the two components is a vehicle body part of a vehicle body to be manufactured. A sphere acting as an "interlocking element" is welded onto the first of the two components. By way of an "interlocking element", which is provided in the second component and may be designed as a hole that interacts with the sphere, the two components are fitted together or clamped together. In this case, the sphere is inserted into the hole and is engaged there. Subsequently, the two components "prefixed" in this manner can be permanently connected with one another, for example, by welding. The "achievable joining precision" very decisively depends on the precision with which the two interacting "interlocking elements" are produced or placed.

It is an object of the invention to provide a method of producing a component that is suitable for a highly precise and simple connection with at least one additional component or for a highly precise and simple prefixing on another component, in which case the method should particularly be usable in the large-scale production of vehicle bodies.

This and other objects are achieved by a method of producing a component, particularly a body component for a vehicle, or of a component composite consisting of several components, with the steps of forming a metal plate in a forming tool, particularly in a deep-drawing die, and producing a reference marking at a predefined location of the metal plate. The formed metal plate is roughly positioned by a positioning device such that the reference marking is situated in a predefined space area. The position of the reference marking is identified by a position recognition device, particularly via a camera system, the position recognition device generating position data corresponding to the position of the reference marking. A first fixing element is positioned at the location of the reference marking on the basis of the position data by way of an electronically controlled positioning device. The first fixing element is connected with the formed metal plate, particularly by welding the first fixing element to the formed metal plate, by a welding device.

Other objects, advantages and novel features of the present invention will become apparent from the following detailed description of one or more preferred embodiments when considered in conjunction with the accompanying drawings.

BRIEF DESCRIPTION OF THE DRAWING

FIG. 1 is an exemplary flowchart illustrating a method of producing a component according to the invention.

DETAILED DESCRIPTION OF THE DRAWINGS

Referring to the flowchart of FIG. 1, the starting point (S10) of the invention is a method for the production of a component, particularly a vehicle body component, or of a component composite consisting of several components. According to the invention, a metal plate is first formed by use of a forming tool (S12). The forming tool may, particularly, be a compressing mold or a deep-drawing die. Correspondingly, the formed metal plate may be a compression-molded component or a deep-drawn component (deep-drawn part).

In at least one location of the formed metal plate, a "reference marking" is produced (S14). The term "reference marking" should be interpreted very broadly. The reference marking may, for example, be a point-type indentation or a depression, or the like. It is important that the reference marking is such that it is suitable for the identification of a reference point on a surface of the formed metal plate that is as clear and precise as possible.

The inventive method consists of the procedure of fixing a first fixing element at or on the formed metal plate. The formed metal plate is first "roughly positioned" by way of a positioning device (S16). "Rough positioning" means, in this context, that the formed metal plate is positioned such that the reference marking is in a predefined space area. It is, for example, contemplated that the formed metal plate is placed on a processing table or a holding device and is aligned such that the reference marking comes to be situated in a predefined "rough-positioning area". The rough-positioning area may, for example, be a square area of 5 cm×5 cm. As an alternative, the rough-positioning area could also be formed by a circular area having a radius of, for example, 5 cm.

For the rough positioning of the formed metal plate, a mechanical limit stop, for example, in the form of one or more "stop shoulders", could be used, against which the formed metal plate is placed. For this purpose, for example, an angular limit stop formed by two stop legs could also be used, against which a "corner area" of the formed metal plate can be placed.

In a further step, the position of the reference marking is identified by way of a "position recognition device" (S18).

The position recognition device may, for example, be a camera system with an assigned electronic analyzing system which generates position data corresponding to the position of the reference marking since the formed metal plate had previously been at least roughly positioned, it is ensured that the reference marking is in a space area in which it can be recognized by the position recognition device.

In a further step, a first "fixing element" is placed or "positioned" on the basis of the position data generated by the position recognition device (S20). The placing or positioning of the first fixing element takes place by way of an electronically controlled device, for example, by use of a robot.

After the placing or positioning of the first fixing element, the latter is connected with the formed metal plate (S22). The first fixing element can, for example, be welded to the formed metal plate. The connecting or welding-on can also take place automatically, for example, by way of a welding robot.

By the above-described method according to the invention, the process described in the above-mentioned DE 10 2009 049 602 B3 can be automated. It is a significant advantage of the invention that the first fixing element used for the loose fixing (pre-fixing) of two components, according to the method of the invention, can be applied very precisely to the formed metal plate component.

According to a further development of the invention, the reference marking is produced during the forming of the metal plate in the forming tool. The production of the reference marking can, for example, take place by way of an embossing element which is provided in the forming tool or is an integral component of the forming tool. For example, an embossing element that is fixedly connected with a mold part of the forming tool is suitable for this purpose. In the case of a two-part forming tool, the embossing element may, for example, be arranged at the upper die or at the lower die, or be the "integral component" of the upper die or of the lower die. As an alternative, the embossing element may also be constructed as an embossing die which can be moved relative to the forming tool, i.e. relative to the upper die or a lower die of the forming tool.

As an alternative, the reference marking could also be produced in a different manner, for example, by use of a laser device.

If the work takes place by way of an embossing element, the latter can be designed such that a rotationally symmetrical, particularly a spherical-cap shaped reference marking, for example, in the shape of a spherical-cap-shaped depression, a conical indentation, or the like is created. The embossing element may also be designed such that a crosshair-type reference marking with two mutually intersecting lines is obtained.

In order to ensure that the position of the formed metal sheet does not change during the mounting of the first fixing element, it may be provided that the metal plate component after the rough positioning and during the mounting of the first fixing element is held in its momentary position by way of a holding device. The holding device may, for example, by a clamping device, particularly a "holding robot".

According to a further development of the invention, the actual position of the first fixing element will be checked after the "setting" of the first fixing element in the location of the reference marking. For this purpose, the position of the first fixing element relative to at least one "orientation point" of the formed metal plate is determined by way of a measuring device. The term "orientation point" should be interpreted extremely broadly. An orientation point may be formed, for example, by a "natural geometrical characteristic" of the formed metal plate, for example, by a corner point, a center of the hole, an edge, or the like.

In particular, a characteristic, such as an additional reference marking produced or generated particularly just for this purpose, may be used as the orientation characteristic. Preferably, several such orientation characteristics or reference markings are provided at the formed metal plate. The orientation characteristic(s) or reference marking(s) can also be produced during the forming of the metal plate in the forming tool, particularly in the same or an analogous manner as the production of the reference marking used for the positioning of the first fixing element.

As mentioned above, via the method according to the invention, a component composite consisting of several components can also be produced. A component composite consists of at least two mutually connected components. For this purpose, a second component, which has a second fixing element interacting with the first fixing element can be connected with the formed metal plate. The two fixing elements are configured such that they form a detachable connection. The second component may be applied to the first component and fixed thereto by way of an electronically controlled device, particularly by a mounting robot. Position data of the formed metal plate component are fed to the electronically controlled device or the robot, particularly position data with respect to the location or position of the first fixing element, which were generated by the position recognition device.

For connecting the two components, the latter are moved with respect to one another such that the first fixing element is inserted along an inserting direction into the second fixing element provided at the second component and is clamped thereto. The two fixing elements may be constructed such that, after the detachable connecting, the two components are fixed relative to one another undisplaceably in directions transversely to the insertion direction. They may further be configured such that the two interacting fixing elements form a clamping or snap connection, the first fixing element engaging at the second fixing element or being moved into a position in which it reaches behind the other fixing element (form-fitting and/or frictional) position. The two components can be clamped to the fixing elements in a mutually frictional and/or form-fitting manner.

After the detachable connection of the two components by way of the fixing elements, the two components can be mutually connected in a permanently fixed or undetachable manner, for example, in a material-locking manner, especially by welding or by means of additional connection elements, such as rivets, screws or the like.

It is an essential advantage of such a detachable connection of the two components that the detachable connection positions the two components sufficiently firmly and precisely relative to one another, so that these can easily be welded to one another without additional fixing devices.

As indicated above, the first fixing element may be a "male fixing element," i.e. a fixing element that projects from the formed metal plate, and the second fixing element may be a "female fixing element" that is provided for receiving the male fixing element.

The male fixing element is preferably larger with respect to the female fixing element transversely to the insertion direction. It is thereby achieved that, after the fitting-together of the fixing elements, the two components are clamped to one another.

According to a further development of the invention, the first fixing element has partly or completely the shape of a sphere or partly or completely a shape similar to a sphere. Such a "convex geometry" has the advantage that, when the male fixing element is inserted into the female fixing element, a catching or jamming is almost impossible. Furthermore, spherical fixing elements can be obtained at very reasonable cost.

The first or male fixing element may consist, for example, of metal, particularly of steel or aluminum. As mentioned above, it can be welded to the formed metal component.

As an alternative to a spherical first fixing element, a first fixing element can be used that has a function head which partly or completely has the shape of a sphere or partly or completely has a shape similar to a sphere and a foot section connected with the function head. The foot section may be connected with the formed metal part, for example, by means of a cold joining method in a form-fitting manner. As an alternative, the foot section may also be welded to the formed metal part.

The female fixing element provided in the second component can particularly be formed by a passage hole. The passage hole may have a circular design or a shape deviating from the circular shape. For example, square or triangular passage holes can be used. The passage hole acting as a female fixing element may, for example, be punched out of the second component.

As outlined above, the formed metal part may be a vehicle body component of a vehicle body to be produced. In the case of a component composite, individual components or all of the additional components may be vehicle body components or attachments.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method of producing a vehicle body component, the method comprising acts of:
    forming, via a forming tool, a metal plate;
    producing a first reference marking at a first predefined location on the metal plate, wherein the metal plate comprises a plurality of orientation characteristics, the plurality of orientation characteristics including a corner point of the formed metal plate, a hole center of the formed metal plate, and an edge of the formed metal plate;
    roughly positioning, via a positioning device, the formed metal plate such that the first reference marking is located in a predefined space area relative to a position recognition device;
    identifying, via the position recognition device, a position of the first reference marking, wherein the position recognition device generates position data corresponding to the identified position of the first reference marking;
    positioning, via an electronically controlled positioning device, a first fixing element at the predefined location of the first reference marking on the basis of the generated position data;
    verifying an actual position of the first fixing element, after the positioning of the first fixing element, by determining, via a measuring device, a position of the first fixing element relative to the plurality of orientation characteristics of the formed metal plate;
    welding, via a welding device, the first fixing element to the formed metal plate at the location of the first reference marking;
    providing a second component having a second fixing element;
    wherein the first fixing element is a sphere and the second fixing element is a hole;
    inserting the sphere into the hole and clamping the sphere in the hole and thus detachably connecting the sphere to the second component to position the first component and the second component sufficiently firmly and precisely relative to one another; and
    permanently fixing the second component to the formed metal plate by welding the second component to the formed metal plate.

2. The method according to claim 1, wherein the act of producing the first reference marking is carried out during the forming of the metal plate in the forming tool.

3. The method according to claim 1, wherein after the rough positioning of the formed metal plate and during the welding of the first fixing element, the formed metal plate is held in position via a holding device.

4. The method according to claim 1, wherein the act of welding the first fixing element is carried out by controlling the welding device via the positioning device.

5. The method according to claim 1, wherein the position recognition device is a camera system.

6. The method according to claim 1, wherein the act of producing the first reference marking is carried out by embossing, via an embossing element of the forming tool, the first reference marking into the metal plate.

7. The method according to claim 6, wherein the embossing element is fixedly connected with a mold part of the forming tool or is an integral component of the mold part.

8. The method according to claim 6, wherein the embossing element is movably arranged relative to a mold part of the forming tool.

9. The method according to claim 1, wherein the first reference marking is rotationally symmetrical, comprising a spherical-cap-shaped depression, in the metal plate.

* * * * *